United States Patent [19]

Otomura et al.

[11] Patent Number: 4,808,316

[45] Date of Patent: Feb. 28, 1989

[54] PROCESS FOR TREATING WASTE WATER CONTAINING URANIUM AND FLUORINE

[75] Inventors: Keiichiro Otomura; Yoshikazu Ogura, both of Kurayoshi; Yoshiaki Echigo, Uji; Mutsunori Yamao, Uji; Tadashi Ishikura, Uji, all of Japan

[73] Assignees: Unitika Ltd., Hyogo; Doryokuro Kakunenryo Kaihatsu Jigyodan, Tokyo, both of Japan

[21] Appl. No.: 11,864

[22] Filed: Feb. 4, 1987

[30] Foreign Application Priority Data

Feb. 18, 1986 [JP] Japan ................................. 61-33588

[51] Int. Cl.$^4$ .................................................. C02F 9/00
[52] U.S. Cl. ............................... 210/664; 210/667; 210/668; 210/677; 210/682; 210/683; 210/684; 210/725; 210/756; 210/764; 210/912; 210/915
[58] Field of Search ........ 210/666, 667, 669, 682–684, 210/723, 778, 670, 764, 664, 668, 677, 725, 756, 912, 915; 423/6, 7, 11

[56] References Cited

U.S. PATENT DOCUMENTS 4,402,918 9/1983 Elliott ................................. 423/7

Primary Examiner—Ivars Cintins
Attorney, Agent, or Firm—Wenderoth, Lind & Ponack

[57] ABSTRACT

A process for treating a waste water containing uranium and fluorine comprises a neutralizing precipitation step wherein slaked lime is added to the waste water containing uranium and fluorine and precipitate thus formed in separated and removed, and an adsorption step wherein supernatant from the neutralizing precipitation step is contacted with a chelating resin which can selectively adsorb fluorine ions and another chelating resin which can selectively adsorb uranyl ions to thereby adsorb and remove the fluorine and uranyl ions remaining in the supernatant. Eluates of the ions adsorbed by the chelating resins and waste liquors for washing and regeneration of these resins are returned to the neutralizing precipitation step. Prior to the neutralizing precipitation step, a decarbonation step may be provided for decomposing carbonate ions, if they are contained in the waste water to be treated.

7 Claims, 3 Drawing Sheets

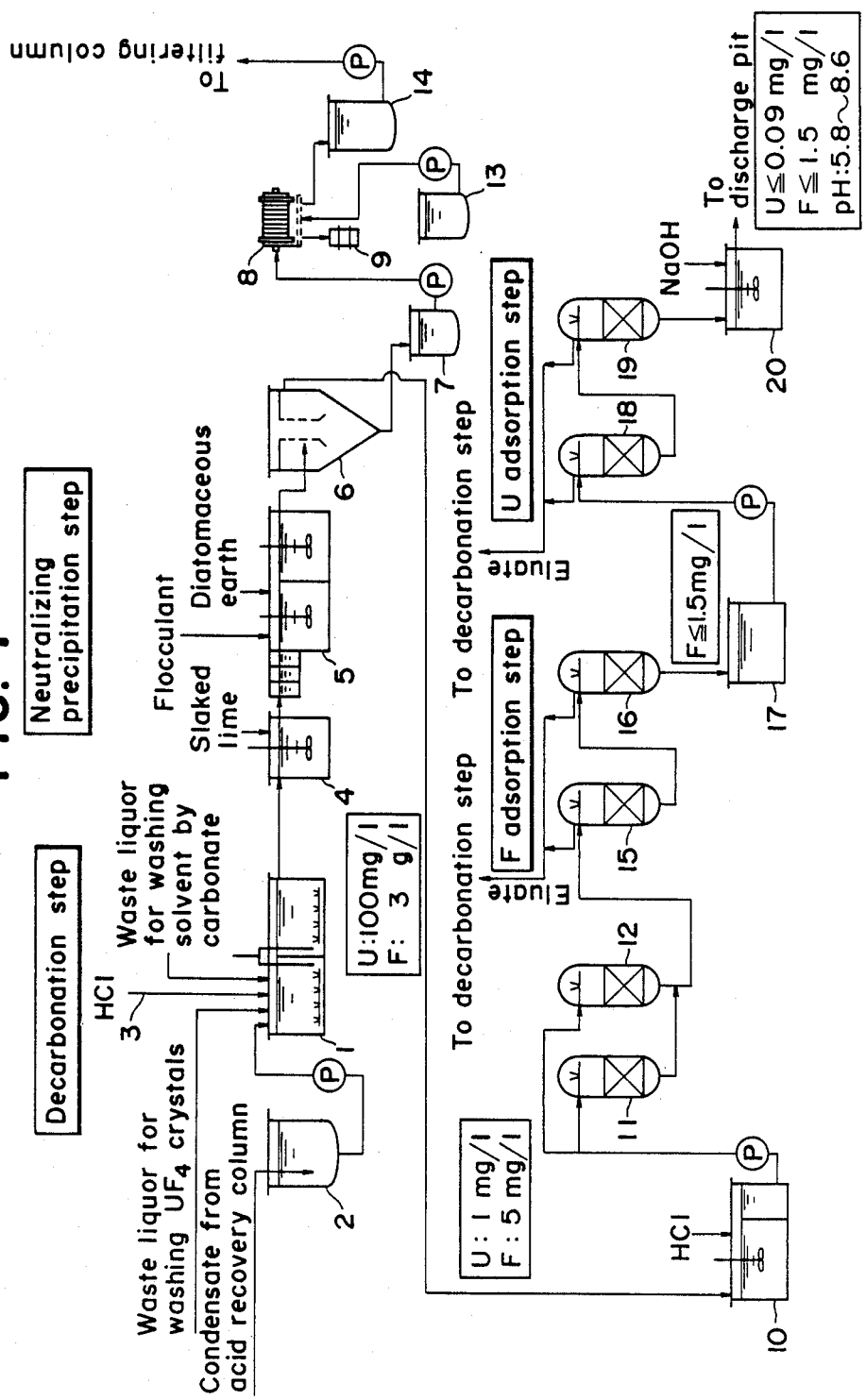
FIG. I

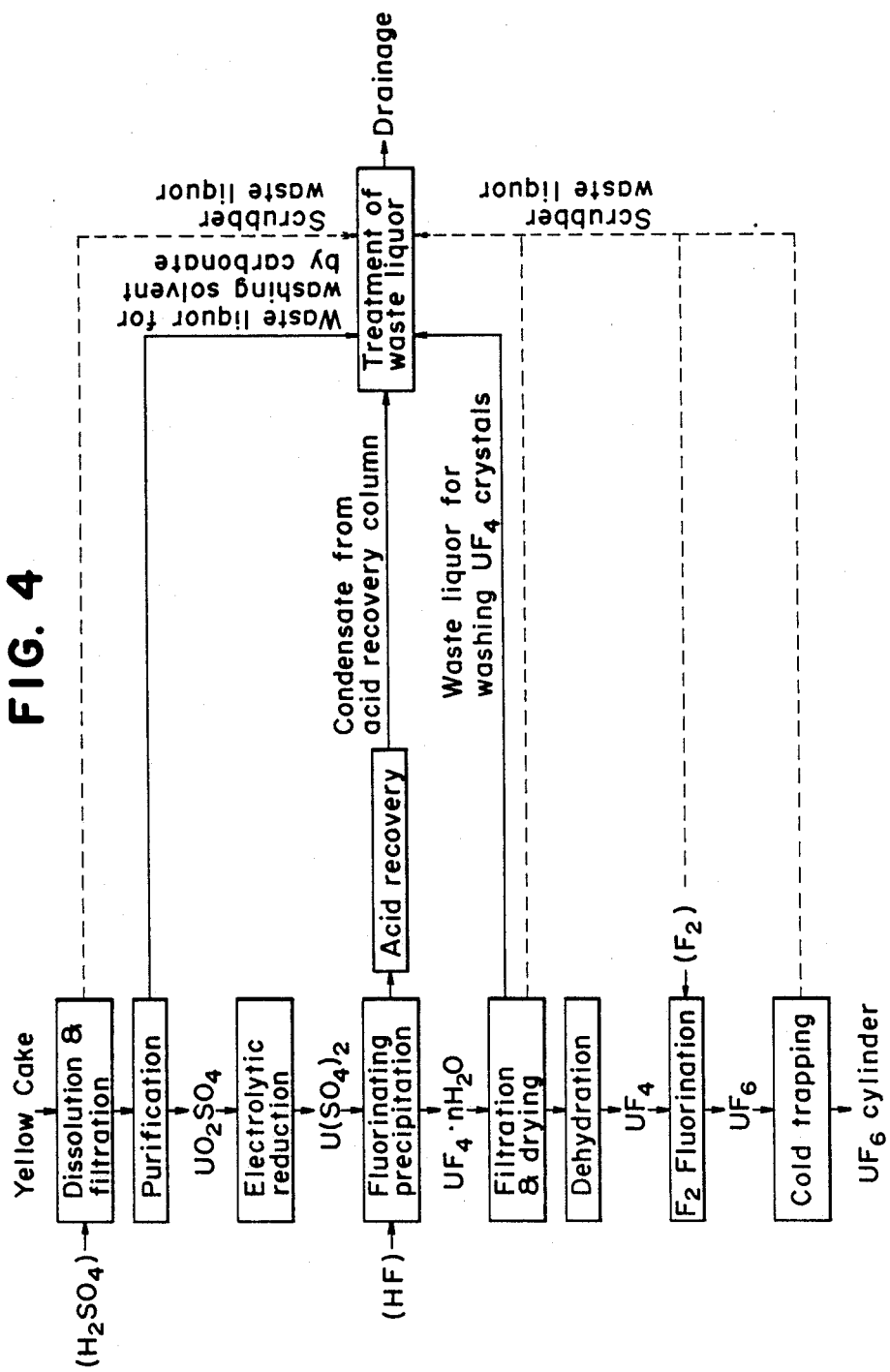

PROCESS FOR TREATING WASTE WATER CONTAINING URANIUM AND FLUORINE

BACKGROUND OF THE INVENTION

This invention relates to a process for treating a waste water containing uranium and fluorine. More particularly, it relates to a process for efficiently removing or decreasing uranium and fluorine in a waste water produced in conversion step of natural or depleted uranium into uranium hexafluoride or in reconversion step of uranium hexafluoride from enriched or depleted uranium into uranium oxide.

FIG. 4 shows an example of a wet process for converting a yellow cake into uranium hexafluoride, in which a waste water containing uranium and fluorine is produced. In this process, a waste liquor for washing a solvent by carbonate, a condensate from an acid recovery columm, a waste liquor for washing $UF_4$ crystals and a scrubber waste liquor are generated as shown in FIG. 4. The following Table shows the typical compositions and amounts of these waste liquors.

| Item | Condensate from acid recovery column | Waste liquor for washing solvent by carbonate | Waste liquor for washing $UF_4$ crystals | Scrubber waste liquor |
| --- | --- | --- | --- | --- |
| pH | ≦1 | 7–8 | 6–8 | 9–11 |
| F | 1.0–3.0 g/l | — | 100 mg/l | 5.0 g/l |
| U | 20 mg/l | 3 mg/l | 100 mg/l | — |
| HCl | 2.0–11.0 g/l | — | — | — |
| $HCO_4$ | — | 10 g/l | — | — |
| Amount | 50 m³/day | 50 m³/day | 24 m³/day | 2 m³/day |

Usually these waste liquors are combined together, treated as a waste water containing uranium and fluorine to thereby lower the concentrations of the uranium and fluorine below the levels defined by the regulation under the law, and then discharged into a river or the like.

Conventional processes for treating a waste water containing uranium and fluorine include solid-liquid separation by neutralizing precipitation and adsorption with ion exchange resins.

However the solid-liquid separation by neutralizing precipitation as described above has a disadvantage that the levels of the uranium and fluorine in the waste water can not be satisfactorily lowered, which makes it necessary to sufficiently dilute the supernatant thus obtained with water prior to discharge thereof. On the other hand, the adsorption with ion exchange resins is superior to the former process in the removal of the uranium and fluorine. However it has some disadvantages that it is necessary to frequently regenerate these resins or to employ large resin columns when the waste water contains these ions at high concentrations; and that it is accompanied by the formation of waste liquors to be treated, i.e., eluates of the ions and washings for the resins.

SUMMARY OF THE INVENTION

Under these circumstances, an object of the present invention is to provide a process for treating a waste water containing uranium and fluorine, by which the concentrations of the uranium and fluorine in the waste water can be sufficiently lowered and eluates of the ions adsorbed by resins, washings for the resins and waste liquors used for regeneration of the resins can also be efficiently treated.

Briefly speaking, a process of the present invention is constructed by a combination of solid-liquid separation by neutralizing precipitation with adsorption using ion exchange resins.

Namely, a process for treating a waste water containing uranium and fluorine, according to the present invention, comprises a neutralizing precipitation step wherein slaked lime is added to the waste water and precipitate thus formed is separated and removed, and an adsorption step wherein supernatant from the neutralizing precipitation step is contacted with a chelating resin which can selectively adsorb fluorine ions and with another chelating resin which can selectively adsorb uranyl ions to thereby adsorb and remove the fluorine and uranyl ions remaining in the supernatant. In this process, eluates of the ions adsorbed by these chelating resins and waste liquors for washing and regeneration of these resins are returned to the neutralizing precipitation step.

In the process of the present invention as described above, most of the uranium and fluorine contained in the waste water can be removed in neutralizing precipitation step. Therefore trace amounts of the remaining uranium and fluorine are to be adsorbed in the following adsorption step, which significantly relieves the load of each resin. Further, eluates of the ions adsorbed by these resins and waste liquors for washing and regeneration of these resins can be returned to the nuetralizing precipitation step, which makes any secondary treatment of these eluates and waste liquors unnecessary.

When uranyl carbonate is further contained in the waste water containing uranium and fluorine, it is preferable to provide a decarbonation step wherein carbonate ions are decomposed by adjusting the pH value of the waste water to 3 or below, prior to the neutralizing precipitation step. This decarbonation step contributes to effectively precipitate the uranium in the following neutralizing precipitation step. In this case, the eluates of the adsorbed ions and the waste liquors for washing and regeneration of the resins may be returned either to the decarbonation step or to the neutralizing precipitaiton step.

BRIEF DESCRIPTION OF THE DRAWINGS

FIG. 1 is a flowsheet showing an embodiment of the process of the present invention;

FIG. 4 is a block diagram which shows the steps of a conventional wet process for uranium conversion and the section where each waste liquor is produced.

PREFERRED EMBODIMENT OF THE INVENTION

Now, an example of the application of the process of the present invention to the treatment of a waste water produced in a conventional wet process for the conversion of uranium as shown in FIG. 4 will be described by reference to a flowsheet as shown in FIG. 1. This waste water to be treated contains a waste liquor for washing solvent by carbonate, a condensate from an acid recovery column and a waste liquor for washing $UF_4$ crystals.

Decarbonation step:

The waste liquor for washing solvent by carbonate contains uranyl carbonate complex ions soluble in water. Since carbonate ions would exert a bad influence on the precipitation of the uranium in the following neutralizing precipitation step, it is desirable to previously decarbonate the waste water to be treated containing such a waste liquor for washing solvent by carbonate. This decarbonation may be effectively carried out by decomposing carbonate ions into carbon dioxide and water by adjusting the pH value of the waste water to 3 or below. The pH adjustment may be performed by mixing the waste water with an acidic waste liquor such as the condensate from an acid recovery column ($\leq pH$ 1) or by adding hydrochloric acid thereto.

In the example as shown in FIG. 1, the waste liquor for washing solvent and for washing $UF_4$ crystals are directly introduced into a decarbonation tank 1 while the condensate from an acid recovery column is supplied to the decarbonation tank 1 via a condensate tank 2. Hydrochloric acid is added from a hydrochloric acid addition line 3. It is possible to automatically add a predetermined amount of hydrochloric acid by previously determining the flow rate of the hydrochloric acid addition line 3 depending on the composition of the waste water to be treated and controlling a valve of the hydrochloric acid addition line 3 in accordance with each of pumps (not shown) for supplying the respective waste washings.

According to our experiment wherein 35% hydrochloric acid is added to the waste liquor for washing solvent (pH 8.17) containing 46.5 mg/l of uranium to give pH values of 2, 3 and 4; slaked lime is added to each mixture to thereby neutralize the same and produce precipitates; and the uranium concentraiton in the supernatant is determined, it has been confirmed that the uranium concentration of the supernatant can be lowered to 1 mg/l or less by adjusting the pH value of the washing to 3 or below.

Further a decrease in the pH value in this decarbonation step brings about an increase in the amount of the slaked lime added in the following neutralizing precipitation step. Thus the removal of fluorine can be performed more effectively as will be described hereinafter.

Neutralizing precipitation step:

The waste water thus decarbonated is then transported to a neutralization tank 4 where slaked lime is added thereto.

Figure 2:
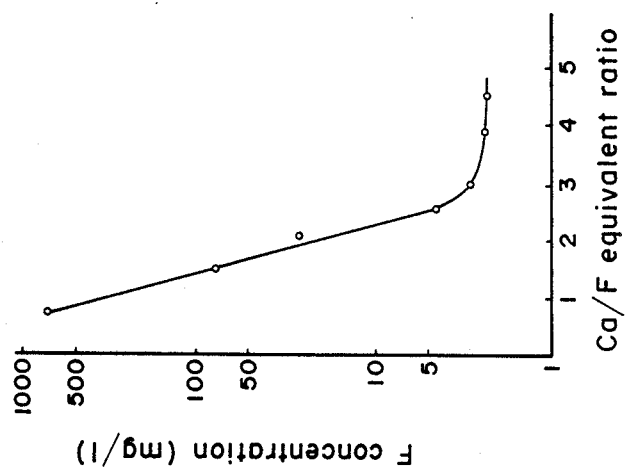
FIG. 2 is a graph which shows the effect of the amount of slaked lime added in the neutralizing precipitation step on the removal of fluorine.

By neutralizing the waste water with the slaked lime, the fluorine in the waste water precipitates as calcium fluoride $CaF_2$. FIG. 2 is a graph which shows the relationship between the amount of the added slaked lime (Ca/F equivalent ratio) and the fluorine concentration in the supernatant. This graph suggests that the fluorine concentration in the supernatant can be effectively lowered when calcium of three equivalents or more is present based on the amount of the fluorine.

Figure 3:
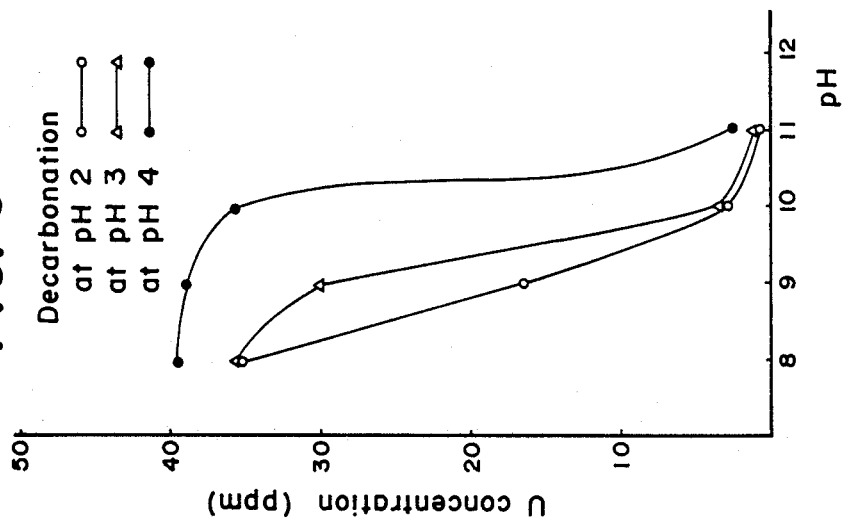
FIG. 3 is a graph which shows the effect of the pH value of waste water to be treated on the removal of uranium in the neutralizing precipitation step of the present invention.

FIG. 3 is a graph which shows the relationship between the pH value and the uranium concentration in the supernatant. This graph is obtained by decarbonating the waste liquor for solvent (pH 8.17) containing 46.5 mg/l of uranium by adding 35% hydrochloric acid to the waste washing to give pH values of 2, 3 and 4; adding slaked lime to each mixture to thereby neutralize the same (pH 8 to 11); and determining the uranium concentration of each supernatant. FIG. 3 suggests that the uranium concentration in the supernatant can be effectively lowered by performing the decarbonation at a pH value of 3 or below and adding slaked lime for neutralization to give a pH value of 11 or above.

Consequently the graphs of FIGS. 2 and 3 as described above suggest that both of the uranium and fluorine in the supernatant can be minimized by adding hydrochloric acid to the waste water to give a pH value of 3 or below in the decarbonation step; and adding slaked lime thereto in the neutralizing precipitation step to give a pH value of 11 or above. According to our experiment wherein 16.8 g of slaked lime is added to 1 l of a mixed waste water containing uranium and fluorine (a mixture of the condensate from an acid recovery column and the waste liquor for washing $UF_4$ crystals. uranium concentration: 116.2 mg/l, fluorine concentration: 2.7 g/l, $pH \leq 1$) to give a pH of 11.7, to thereby form precipitate, the supernatant contains 0.66 mg/l of uranium and 5.3 mg/l of fluorine.

The precipitate of calcium fluoride formed by the neutralization is in the form of fine crystals of poor sedimentation and filtrability. Therefore it is preferable to add a flocculant, e.g., a strongly anionic polyacrylamide polymer flocculant thereto to enhance the sedimentation velocity of the precipitate. Further the addition of diatomaceous earth as a filter aid can lower the specific filtration resistance. The result of our experiment indicates that, when 40 mg/l of the polymer flocculant as described above and 1 g/l of diatomaceous earth are added, the sedimentation velocity and the specific filtration resistance of a floc formed by the neutralizing precipitation are 18 m/hr and $1.09 \times 10^{10}$ m/kg, respectively.

The suspension formed through the addition of the flocculant and diatomaceous earth in a flocculation tank 5 is then transported to a thickener 6 where it is allowed to stand for solid-liquid separation. The slurry drawn from the bottom of the thickener 6 is transported to a slurry tank 7 and then to a filter 8, e.g., a filter press where it is filtered and dehydrated to give a highly releasable cake of a moisture content of 50% or below, which is then stored in a drum 9.

The supernatant drawn from the top of the thickener 6 is transported to a relay tank 10 and then to filtering columns 11 or 12 where the suspended substances remaining in the supernatant are removed. The pH value of the supernatant may be adjusted, if required, to 3 to 4 which is optimum for the following adsorption step by adding hydrochloric acid thereto in the relay tank 10.

In FIG. 1, the reference numeral 13 is a tank for waste washing filter clothes used in the filter 8, while 14 is a tank for the filtrate which is produced from the filter 8 and transported to the filtering columns 11 or 12.

Fluorine adsorption step:

The supernatant free from any suspended substances is then transported to adsorbing columns 15 and 16 wherein a chelating resin which can selectively adsorb fluorine ions, e.g., a phenol-formalin chelating resin of zirconium hydroxide type is packed. Fluorine ions contained in the supernatant are selectively adsorbed by the chelating resin when the supernatant is passing through these adsorbing columns. This passage can be most efficiently performed under such a condition that the pH value of the supernatant prior to the passage is 4 and the space velocity (SV) thereof is 5 or below.

The fluorine adsorbed by the resin is preferably eluted by passing 1 N sodium hydroxide through the resin at a ratio of 3.5 l per liter of the resin. It is further preferable to pass 1 N hydrochloric acid through the resin at a ratio of approximately 2 l per liter of the resin prior to the elution, to thereby present lingering elution of the fluorine in the eluate, i.e., so-called tailing.

According to our experiment where a waste water (pH 4) containing 5.3 mg/l of fluorine is passed through the fluorine adsorbing column at SV 5, the amount of the liquid passed until the completion of the adsorption is 700 l per liter of the resin. When the resin containing the adsorbed fluorine is washed with 1 N hydrochloric acid and eluted by passing 1 N sodium hydroxide at a ratio of 3.5 l per liter of the resin, 98.8% of the fluorine is removed and an eluate containing 1.2 g/l of fluorine is obtained.

Since the eluate and the waste liquors for washing and regeneration of the resin contain fluorine, they are returned to the decarbonation tank 1 or the neutralization tank 4 and recovered in the drum 9 in the form of precipitated calcium fluoride.

In the embodiment as shown in the figure, the two fluorine adsorbing columns 15 and 16 are operated in series in such a manner that when the resin in one column is regenerated, the liquor is passed through the other column alone.

Uranium adsorption step:

The supernatant free from fluorine is transported to a relay tank 17 and then to adsorbing columns 18 and 19 in which a chelating resin which can selectively adsorb uranyl ions, e.g., a phosphonic acid type chelating resin is packed. Uranyl ions contained in the supernatant are selectively absorbed by the chelating resin when the supernatant is passing through these adsorbing columns 18 and 19. This adsorption of the uranyl ions may be most efficiently performed under such a condition that the pH value of the supernatant prior to the passage is 4 and the SV thereof is 10.

The uranyl ions adsorbed by the resin are preferably eluted by passing 0.4 M sodium hydrogencarbonate through the resin at a ratio of 10 l per liter of the resin. The uranyl carbonate contained in the eluate may be converted into uranyl sulfate with the use of an anion exchange resin, when the concentration of uranium in the eluate is relativley high. The thus converted uranyl sulfate may be transported to the main step of the conventional wet process for uranium conversion and then recovered. When the eluate contains uranium at a lower concentration, it may be returned to the decarbonation tank 1 or the neutralization tank 4, together with the waste liquors for washing and regeneration of the chelating resin, and recovered in the drum 9 in the form of a precipitate.

According to our experiment where a waste water (pH 4) containing 2.8 mg/l of uranium is passed through the uranium adsorbing column at SV 10, the amount of the liquid passed until the completion of the adsorption is 3000 l per liter of the resin. When the resin containing the adsorbed uranium is eluted with 0.4 M sodium hydrogencarbonate, 90% or more of the uranium can be removed.

In the embodiment as shown in the figure, the uranium adsorbing columns 18 and 19 are operated in series similar to the fluorine adsorbing columns as mentioned above. When these uranium adsorbing columns are operated for a prolonged period of time, the growth of microorniganisms on the surface of the resin in the columns might bring about a decrease in the uranium adsorption or an increase in the pressure loss in the columns. In order to prevent these disadvantages, it is preferable to add sodium hypochlorite to the waste water to be passed through the uranium adsorbing columns in an amount of approximately 0.1 mg/l. Thus the growth of microorganisms in the adsorbing columns can be effectively inhibited and no bad influence on the resin such as deterioration is observed.

The waste water thus treated to be free from uranium is stored in a storage tank 20, where it is finally neutralized with the use of sodium hydroxide. After determining the concentrations of uranium and fluorine for confirmation, the waste water is discharged.

In the embodiment as shown in FIG. 1, the concentrations of uranium and fluorine in the waste water to be treated in the decarbonation tank 1 are 100 mg/l and 3 g/l, respectively. The uranium and fluorine concentrations in the supernatant from the thickener 6 are 1 mg/l and 5 mg/l, respectively. The fluorine concentration in the waste water from the uranium adsorbing column 16 is 1.5 mg/l or below. The uranium and fluorine concentrations in the treated waste water to be finally discharged from the storage tank 20 are 0.09 mg/l or below and 1.5 mg/l or below, respectively.

In the emobidment as shown in FIG. 1, the scrubber waste liquor formed in the wet uranium conversion process as shown in FIG. 4 is treated batchwise, subjected to the determination of fluorine concentration and introduced into the decarbonation tank 1 in the decarbonation step, after adding the required amount of hydrochloric acid.

The foregoing describes the case in which various waste liquors containing uranium and fluoride formed in the wet uranium conversion process as shown in FIG. 4 are treated, particularly the case in which decarbonation step as a pretreatment prior to the neutralizing precipitation step is provided because of the presence of uranyl carbonate in the waste water to be treated. However, the decarbonation step may be omitted when a waste water containing no uranyl carbonate is treated.

As described hereinbefore, the process of the present invention comprises a combination of a neutralizing precipitation step with an adsorption step using chelating resins, and uranium and fluorine contained in a waste water to be treated are roughly removed in the former neutralizing precipitation step and small amounts of uranium and fluorine remaining in the supernatant are removed by adsorbing in the later adsorption step. Thus, the load of the resins can be significantly relieved. As a result, the uranium and fluorine can be effectively removed to give final concentrations of uranium and fluorine in the treated waste water below 1/10 of the levels defined by the regulation under law.

The process of the present invention has a further advantage that all of the waste liquors including eluates of the uranyl and fluorine ions adsorbed by the resins, waste for washing the resins and waste for regeneration thereof can be returned to the neutralizing precipitation step or the decarbonation step, which makes any secondary treatment of these waste liquors unnecessary.

What is claimed is:

1. A process for treating waste water containing uranium and fluorine, comprising a neutralization step carried out by adding slaked lime to the waste water containing uranium and fluorine to form a precipitate and a supernatant, separating and removing the precipitate and an adsorption step carried out by contacting the supernatant from said neutralizing precipitation step with a zirconium hydroxide-containing chelating resin which can selectively adsorb fluorine ions and another phosphonic acid containing chelating resin which can selectively adsorb uranyl ions to thereby absorb and remove the fluorine and uranyl ions remaining in said supernatant, and returning eluates of the ions adsorbed by said chelating resins and waste liquors for washing and regeneration of these resins to said neutralizing precipitation step.

2. The process for treating a waste water containing uranium and fluorine according to claim 1, comprising further adding a strongly anionic polyacrylamide polymer flocculant and diatomaceous earth to the waste water in said neutralizing precipitation step to enhance the sedimentation velocity and the filtrability of the precipitate.

3. The process for treating a waste water containing uranium and fluorine according to claim 1, comprising employing, in said fluorine ion adsorption step, a phenol-formalin chelating resin of zirconium hydroxide type as the resin which can selectively adsorb fluorine ions, employing sodium hydroxide as an eluent for the adsorbed fluorine ions, and acidifying the supernatant from said neutralizing precipitation step before it is contacted with said resin.

4. The process for treating a waste water containing uranium and fluorine according to claim 3 comprising contacting, in said fluorine ion adsorption step, the supernatant from said neutralizing precipitation step with said resin and then contacting the resin with hydrochloric acid prior to contacting the eluent with the resin to prevent tailing during the elution of the fluorine ions adsorbed by said resin.

5. The process for treating a waste water containing uranium and fluorine according to claim 1, which comprises employing in said uranyl ion adsorption step, a phosphonic acid type chelating resin as the resin which can selectively adsorb uranyl ions, and employing sodium hydrogencarbonate as an eluent for the adsorbed uranyl ions.

6. The process for treating a waste water containing uranium and fluorine according to claim 1 which comprises adding in said uranyl ion adsorption step, sodium hypochlorite to the waste water to contact the resin therewith so as to prevent the growth of microorganisms on the surface of the resin.

7. A process for treating a waste water containing uranium and fluorine comprising a decarbonation step carried out by adjusting the pH value of the waste water containing uranium and fluorine to 3 or below to decompose carbonate ions in the waste water, a neutralizing precipitation step carried out by adding slaked lime to the waste water from said decarbonation step to form a precipitate and a supernatant, separating and removing the precipitate, and an adsorption step carried out by contacting the supernatant from said neutralizing precipitation step with a zirconium hydroxide-containing chelating resin which can selectively adsorb fluorine ions and another phosphonic acid-containing chelating resin which can selectively adsorb uranyl ions to thereby adsorb and remove the fluorine and uranyl ions remaining in said supernatant, and returning eluates of the ions adsorbed by said chelating resins and waste liquors for washing and regeneration of these resins to said decarbonation step or neutralizing precipitation step.

* * * * *